US008320046B2

(12) United States Patent
Lundvall

(10) Patent No.: US 8,320,046 B2
(45) Date of Patent: Nov. 27, 2012

(54) OPTICAL DEVICE

(75) Inventor: Axel Lundvall, Solna (SE)

(73) Assignee: Rolling Optics AB, Stockholm (SE)

( * ) Notice: Subject to any disclaimer, the term of this patent is extended or adjusted under 35 U.S.C. 154(b) by 228 days.

(21) Appl. No.: 12/810,903

(22) PCT Filed: Dec. 19, 2008

(86) PCT No.: PCT/SE2008/051527
§ 371 (c)(1),
(2), (4) Date: Jun. 28, 2010

(87) PCT Pub. No.: WO2009/085003
PCT Pub. Date: Jul. 9, 2009

(65) Prior Publication Data
US 2010/0277806 A1   Nov. 4, 2010

(30) Foreign Application Priority Data

Dec. 27, 2007   (SE) ..................................... 0702906

(51) Int. Cl.
*G02B 27/10* (2006.01)

(52) U.S. Cl. ........... 359/622; 359/619; 359/463; 283/72

(58) Field of Classification Search .......... 359/619–627, 359/463, 540, 742; 283/72, 87, 93, 106; 362/97.1, 227, 311.01, 311.02; 353/30, 38, 353/43, 94; 352/81, 87; 40/615
See application file for complete search history.

(56) References Cited

U.S. PATENT DOCUMENTS

| 1,918,705 | A | 7/1933 | Ives |
| 4,082,426 | A | 4/1978 | Brown |
| 6,369,949 | B1 * | 4/2002 | Conley ........................... 359/619 |
| 6,545,813 | B1 * | 4/2003 | Matthies et al. ............... 359/622 |
| 6,646,807 | B2 * | 11/2003 | Yoshikawa et al. ............ 359/619 |
| 7,333,268 | B2 * | 2/2008 | Steenblik et al. .............. 359/619 |
| 8,027,093 | B2 * | 9/2011 | Commander et al. ......... 359/619 |
| 2003/0017307 | A1 | 1/2003 | Orlandi |

(Continued)

FOREIGN PATENT DOCUMENTS

JP   7-281327   10/1995

(Continued)

OTHER PUBLICATIONS

M.C. Hutley et al, "The Moire magnifier", Pure Appl. Opt. 3, 1994, pp. 133-142, IOP Publishing Ltd.

(Continued)

*Primary Examiner* — Loha Ben
(74) *Attorney, Agent, or Firm* — Young & Thompson

(57) ABSTRACT

An optical device (10) for providing a synthetic integral image includes a polymer foil stack (111). The polymer foil stack (111) includes at least one polymer foil (11). A first interface (17) of the polymer foil stack (111) includes optically distinguishable image data bearer structures (116). The first interface (17) has a general shape defined by a first array (115) of curved interface portions (117), on which the image data bearer structures (116) are superimposed. Preferably, the optical device (10) includes a second interface (12) of the polymer foil stack (111), which has a second array (13) of microlenses (14). The second interface (12) is provided at a distance from the first interface (17), which distance is close to a focal length of the microlenses (14). The second array (13) is in registry with the first array (115).

19 Claims, 10 Drawing Sheets

U.S. PATENT DOCUMENTS

| | | |
|---|---|---|
| 2005/0180020 A1 | 8/2005 | Steenblik et al. |
| 2007/0058260 A1 | 3/2007 | Steenblik et al. |
| 2011/0222152 A1* | 9/2011 | Lundvall .................. 359/463 |

FOREIGN PATENT DOCUMENTS

| | | |
|---|---|---|
| WO | 94/27254 | 11/1994 |
| WO | 03/061983 | 7/2003 |
| WO | 2007/115244 | 10/2007 |

OTHER PUBLICATIONS

H Kamal et al, "Properties of moire magnifiers", Optical Engineering 37 (11), Nov 1998, pp. 3007-3014.

International Search Report dated Mar. 18, 2009, from corresponding PCT application.

* cited by examiner

OPTICAL DEVICE

TECHNICAL FIELD

The present invention relates in general to optical devices and in particular to optical devices providing a synthetic integral image.

BACKGROUND

Planar optical arrangements giving rise to a synthetic, more or less three-dimensional, image or an image that changes its appearance at different angles have been used in many applications. Besides purely esthetical uses, such arrangements have been used e.g. as security labels on bank-notes or other valuable documents, identification documents etc. The synthetic three-dimensional images have also been used for providing better geometrical understanding of complex shapes in e.g. two-dimensional information documents.

In the published international patent application WO 94/27254 [1], a security device is disclosed. The security device comprises an array of microimages which, when viewed through a corresponding array of substantially spherical microlenses, generates a magnified image. This result is achieved according to the long known Moiré effect and was now applied to provide security labels with images having a three-dimensional appearance. The array may also be bonded to the array of microimages.

In the published US patent application US 2005/0180020 [2], a micro-optic security and image presentation system is disclosed, being based on a similar basic idea. A film material utilizes a regular two-dimensional array of non-cylindrical lenses to enlarge micro-images or image data bearer structures of an image plane. By adapting the focal properties of the lenses, the distance between the lenses and the image plane, the diameter of the lenses, different magnifications, field of view, apparent depth etc. may be changed.

In an ideal spherical microlens, there are still effects causing unsharpness of the created image. Spherical aberrations are present, which gives rays passing the microlens surface at a relative low angle a different focal point. Furthermore, even without spherical aberrations, blurring is introduced when the image is viewed in a non-perpendicular direction, since the focal length of the spherical microlens does not exactly match the distance between the point at which a paraxial ray passes the lens and the position of the image data bearer structure. This is in US2005/0180020 solved by providing image data bearers that have a certain non-negligible height. Even at slanted view directions, the image data bearer information will thereby be present at a focal point of the microlens. However, such arrangements do only partly solve the problem, since they instead introduce a blurring effect due to the very same extension in height. Rays that have their actual focal point besides a certain image data bearer structure will anyway be influenced by the structure on its way to or from the focal point, when the viewing angle is tilted enough. The approach in US2005/0180020 for solving the blurring problem therefore does not solve the problem entirely.

In the published international patent application WO 2007/115244 a sheeting presenting a composite floating image is disclosed. A layer of microlenses covers a surface with radiation sensitive material. By exposing the arrangement for high-energy radiation, the radiation sensitive material records the distribution of radiation that has passed through the lens array. The radiation distribution carries information about the three-dimensional properties of the radiation. When the arrangement later is exposed for light, a floating image resembling the high-energy radiation can be viewed. This arrangement is thus a variation of integral photography. However, the use of photographic recording without developing processes gives images of low quality and the need of radiation exposure of the assembled arrangement is unsuitable for low-cost industrial production.

SUMMARY

A general object of the present invention is to provide thin and cost-efficiently produced optical devices for synthetic three-dimensional images with high sharpness also when viewed in a non-perpendicular angle.

The above object is achieved by devices according to the enclosed patent claims. In general words, in a first aspect, an optical device for providing a synthetic integral image comprises a polymer foil stack. The polymer foil stack comprises at least one polymer foil. A first interface of the polymer foil stack comprises optically distinguishable image data bearer structures. The first interface has a general shape defined by a first array of curved interface portions, on which the image data bearer structures are superimposed.

In a second aspect, a security label comprises at least one optical device according to the first aspect.

In a third aspect, a valuable document or valuable object comprises at least one security label according to the second aspect.

In a fourth aspect, a sheet material comprises at least one optical device according to the first aspect.

In a fifth aspect, package comprises a sheet material according to the fourth aspect.

One advantage with the present invention is that virtual, typically three-dimensional, images are presented, having a good sharpness also when viewed in tilted direction.

BRIEF DESCRIPTION OF THE DRAWINGS

The invention, together with further objects and advantages thereof, may best be understood by making reference to the following description taken together with the accompanying drawings, in which.

DETAILED DESCRIPTION

The optical device according to the present invention operates according to principles similar to what is known as the Moiré effect. In the present application, the Moiré effect provides a magnification of a pattern and at the same time gives a synthetic integral, typically three-dimensional, image. Such an integral image is a perfect candidate to be used as security label or simply for being eye-catching. The Moiré magnifying principle as such is well known from the literature, and overviews can be found in e.g. [3] or [4]. Arrangements operating according to the Moiré effect generally require high precision regarding the relative positions of the lens array and the array of objects to be magnified.

As shown e.g. by US2005/0180020 [2], an array of microlenses as well as an array of objects to be magnified may be provided as integrated parts within one and the same polymer foil stack. The distance in the polymer foils between the array of microlenses and the array of objects becomes well defined by the thicknesses of the polymer foils. The relative positioning of the array of microlenses with respect to the array of objects then just becomes a matter of manufacturing precision. When the single polymer foil once is manufactured, the use and handling of the foil does not require any particular accuracy in order to maintain the requested optical effect.

This has its origin in the fact that the microlenses as well as the objects are interconnected laterally by a continuous polymer foil or polymer foil stack. The relative positions within the foil or foil stack are well preserved to a high degree of accuracy as long as the foil as such is intact.

Also the fact that the foil stack mechanically connects to the microlenses, and the objects in such a way that an entire path of light between each of the microlenses and a respective object portion is constituted by the polymer foil ensures that the optical properties are substantially unchanged as long as the polymer foil is maintained intact and substantially kept in its intended shape.

In other words, by providing microlenses and objects as structures in one and the same polymer foil stack without introduction of external parts of other materials, a robustness during handling is improved. Such robustness is almost a necessity for being able to produce optical devices of this type in an industrially compatible and cost-efficient manner.

Figure 1:
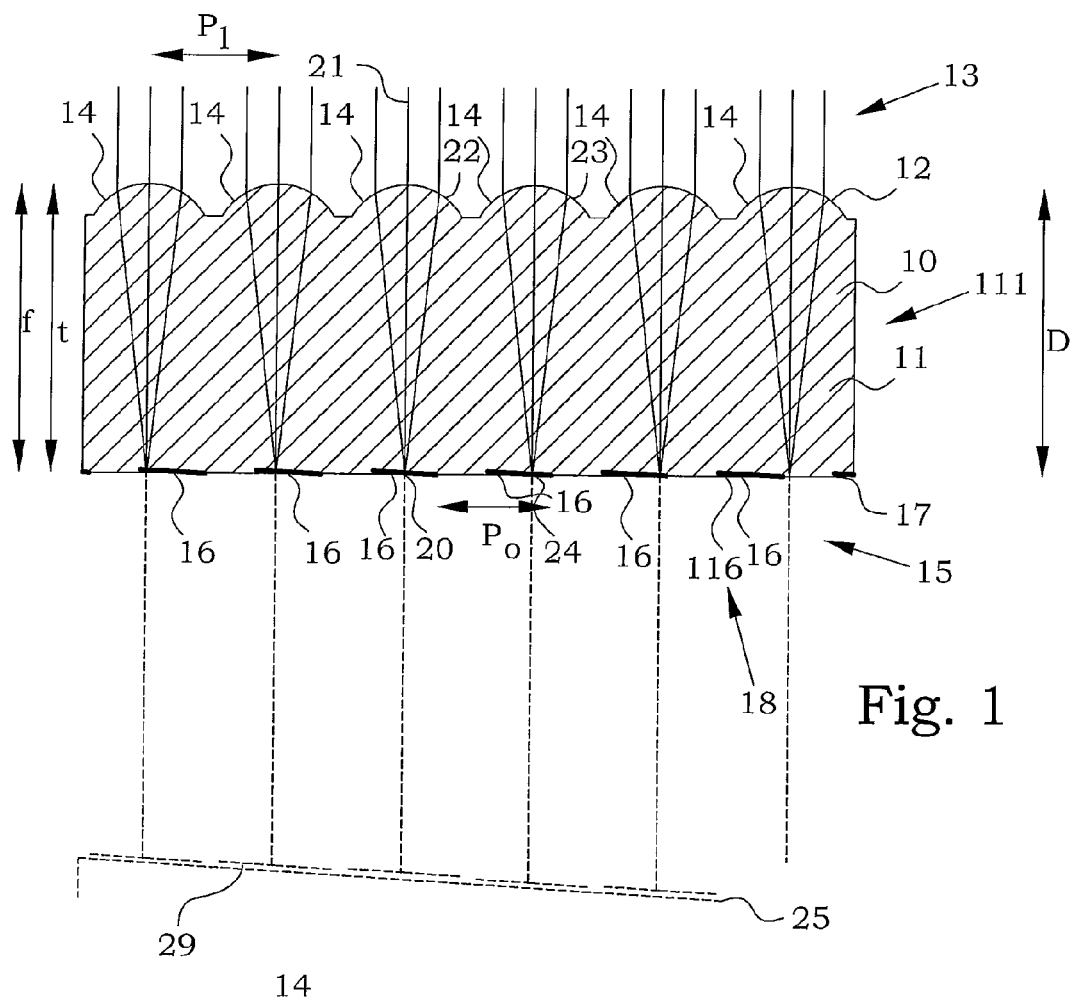
FIG. 1 is a cross-sectional view of an embodiment of an optical device based on creating a total image from magnified part images.

In order to understand the advantages of the present invention, a conventional optical device based on integration of magnified images of small image data bearer structures is first described. FIG. 1 illustrates schematically a cross-sectional view of an embodiment of an optical device 10 based on integration of magnified images of small image data bearer structures. The optical device 10 comprises a polymer foil stack 111, in this embodiment constituted by a single polymer foil 11 of thickness t. At an interface 12, in this case an outer surface of the polymer foil 11, an array 13 of microlenses 14 are provided. The array 13 is typically a periodic two-dimensional array, which therefore is depicted as a one-dimensional array in the cross-sectional view of FIG. 1, with a periodicity $P_l$ in the illustrated cross-section. In this embodiment, the microlenses 14 are embossed or imprinted in the polymer foil 11 itself. As mentioned above, such arrangement gives a robustness in the lateral plane.

The polymer foil 11 is also provided with another array 15 of identical geometrical structures 16. The geometrical structures 16 cause a difference in optical properties as seen from the microlens side. In the present embodiment, the geometrical structures 16 are provided at an interface 17 of the polymer foil 11, in the present embodiment another surface, opposite to the surface at which the microlenses 14 are provided. The geometrical structures 16 in the present embodiment therefore become an interface 17 between the interior of the polymer foil 11 and the space 18 behind the polymer foil 11. The differences in optical properties of the polymer foil 11 and the space 18 makes it possible to distinguish the shape of the geometrical structures 16. The geometrical structures 16 thereby constitutes optically distinguishable image data bearer structures 116, which together as viewed through the microlenses 14 compose an image. Other alternatives for image data bearer structures 116 could e.g. be structures of different colours, different reflectivity or absorption, which also gives rise to differences in optical properties.

The array 15 is in the present embodiment also a periodic two-dimensional array and has furthermore the same symmetry properties as the array 13 of microlenses 14. A symmetry axis of the array 15 of identical geometrical structures 16 is parallel to a symmetry axis of the array 13 of microlenses 14. In other words, the arrays 13, 15 are essentially aligned by their symmetry axes. If, for example, both arrays exhibit a hexagonal pattern, the close-packed directions are aligned. The array 15 of identical geometrical structures 16 has a periodicity $P_o$, in the illustrated cross-section plane. The polymer foil 11 is essentially transparent or coloured transparent, at least in the volume between the pattern planes. In a typical embodiment, the geometrical structures 16 are imprinted or embossed into the polymer foil 11. Alternatively, the geometrical structures 16 could be printed onto the polymer foil 11 surface.

In order for the classical Moiré effect to be present, the periodicity $P_o$ of the array 15 of identical geometrical structures 16 differs by a non-integer factor from the periodicity $P_l$ of the array 13 of microlenses 14. This relation determines the magnifying factor, as will be described more in detail below. Furthermore, the array 15 of identical geometrical structures 16 has to be provided at a distance D from the first side 12 of the polymer foil 11 that is sufficiently close to a focal length f of the microlenses 14. In the present embodiment, having the geometrical structures 16 at the second side 17 of the polymer foil 11, this puts a requirement on that the average thickness of the polymer foil 11 should be essentially equal to the focal length f. However, as discussed more in detail further below in connection with particularities of the present invention, the distance between the arrays 13, 15 does not have to be exact equal to the focal length f.

The magnification of the image is dependent on the relative sizes of the periodicities $P_l$ and $P_o$. In FIG. 1, the periodicity $P_o$ of the array of image data bearer structures 116 is slightly smaller than the periodicity $P_l$ of the array of microlenses 14, i.e. $P_o < P_l$. A specific spot 20 at one of the geometrical structures 16 is in the illustrated embodiment situated exactly below, and furthermore in the focal point of one microlens 22 of the microlenses 14. This means that light originating from the spot 20 ideally can travel through the polymer foil 11 and be refracted in the microlens above into a parallel beam of light rays 21. A spectator watching the first side 12 of the polymer foil 11 will experience the optical characteristics of the area around spot 20 spread out over the entire microlens 22, i.e. an enlarged part image 29 will be experienced. The microlens 23 will in the same manner provide another enlarged part image 29 of an area around spot 24 of another of the geometrical structures 16. Since there is a slight mismatch in periodicity, the area around spot 24 does not correspond exactly to the area around spot 20, but instead to an area slightly beside. By having a large number of microlenses 14 and geometrical structures 16, the areas that are imaged will ideally origin from every area of the geometrical structures 16. A spectator will thus experience a synthetic integral image 25 composed by the small part images 29 corresponding to a respective microlens 14. The part images 29 will together be experienced by the eye as a magnified synthetic integral image 25 of the geometrical structure 16.

From simple geometrical reasoning, it is found that the magnification becomes:

$$M = \frac{1}{F - F^2}, \text{ where } F = \frac{P_o}{P_l}. \quad (1)$$

This relation is valid for parallel rays, i.e. when the foil is viewed from a distance that can be approximated by infinity. One may notice that the magnification becomes very large when the factor F comes close to unity. For a factor equal to unity, the magnification becomes infinite, which is not very useful, since only one single spot at the geometric structures then will be visible. In order to get a useful image, it is thus necessary that the factor F differs from unity, and, as will be discussed further below, that the factor F differs from any integer value, i.e. F has to be a non-integer factor.

However, in order to achieve a large magnification, the factor should preferably be close to 1. In the embodiment of FIG. 1, the factor is smaller than 1, since $P_o < P_l$. The magnification thus has a positive value. If $P_o > P_l$, the factor is smaller than 1 and the magnification becomes negative, i.e. the image is reconstructed as an inverted image.

The design parameters of the polymer foil 11 have further impacts on the optical properties. Besides the property of magnifying the geometrical structures, the polymer foil 11 typically also provides a synthetic three-dimensional experience.

The focal distance of the microlens is given by:

$$f = \frac{n_2 R}{(n_2 - n_1)}, \quad (2)$$

where R is the microlens radius, $n_2$ is a refractory index for the microlenses and $n_2$ a refractory index for the medium covering the microlenses 14, i.e. typically air.

Figure 2:
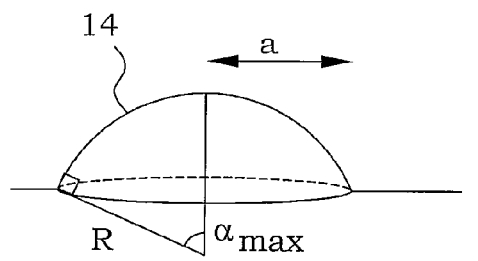
FIG. 2 is a schematic illustration of maximum field of view of a microlens.

The field of view is mainly limited by the geometrical dimensions of the microlenses. FIG. 2 illustrates a microlens 14, having a base plane radius a. A maximum angle of view $\alpha_{max}$ is then given by the maximum angle, at which the microlens surface can be reached at a perpendicular angle, i.e.:

$$\alpha_{max} = \arcsin\left(\frac{a}{R}\right). \quad (3)$$

When the maximum angle is exceeded, the image will rapidly deteriorate.

The size of the periodicity $P_l$ of the microlenses determines basically the resolution of the synthetic image. The periodicity $P_l$ can not be too large, since the synthetic image then will be granular. It is thus preferred to use a periodicity $P_l$ of the microlenses less than 200 micrometers, and even more preferably less than 100 micrometers. However, since the periodicity of the geometrical structures typically is of a corresponding size to the periodicity of the microlenses, very small periodicity $P_l$ of the microlenses put high accuracy requirements on the placement of the geometrical structures relative to the lenses and a very large magnification has to be used in order to produce images that are attractive for the viewer. If extremely small periodicities are used, disturbing diffraction effects may also be present. It is thus preferred to use a periodicity $P_l$ of the microlenses larger than 10 micrometers.

The sharpness, magnification and depth of the image is to a first approximation independent on the angle of view. However, since the microlenses suffer from spherical aberrations and the fact that the actual focal point of a lens generally does not appear at a flat surface for differing angles of view, minor differences will in practice be present when viewing the image at higher angles relative to a main polymer foil normal. The situation in FIG. 1 is therefore somewhat simplified.

Figure 3A:
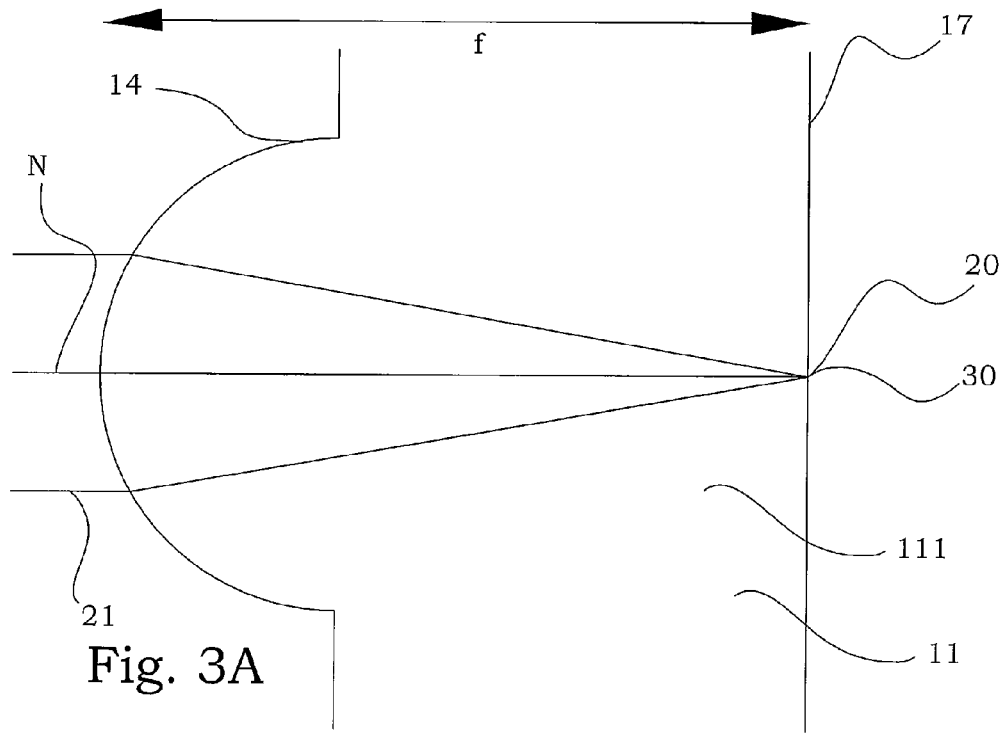
FIGS. 3A-3D are schematic illustrations of relations between focal points and incidence angles in a polymer foil with spherical microlenses.

FIG. 3A illustrates a situation where a beam of parallel rays 21 reaches the polymer foil at a zero angle of incidence with respect to a main foil surface normal N, i.e. perpendicular to the foil 11. If neglecting the spherical aberrations, the rays 21 are refracted into a single spot 20 at the interface 17 of the image data bearer structures 116. In other words, a focal point 30 is situated in the interface 17 plane. In the opposite direction, the optical properties of the spot 20 are thereby mediated out from the foil as a beam of parallel rays. A sharp image component is provided.

Figure 3B:
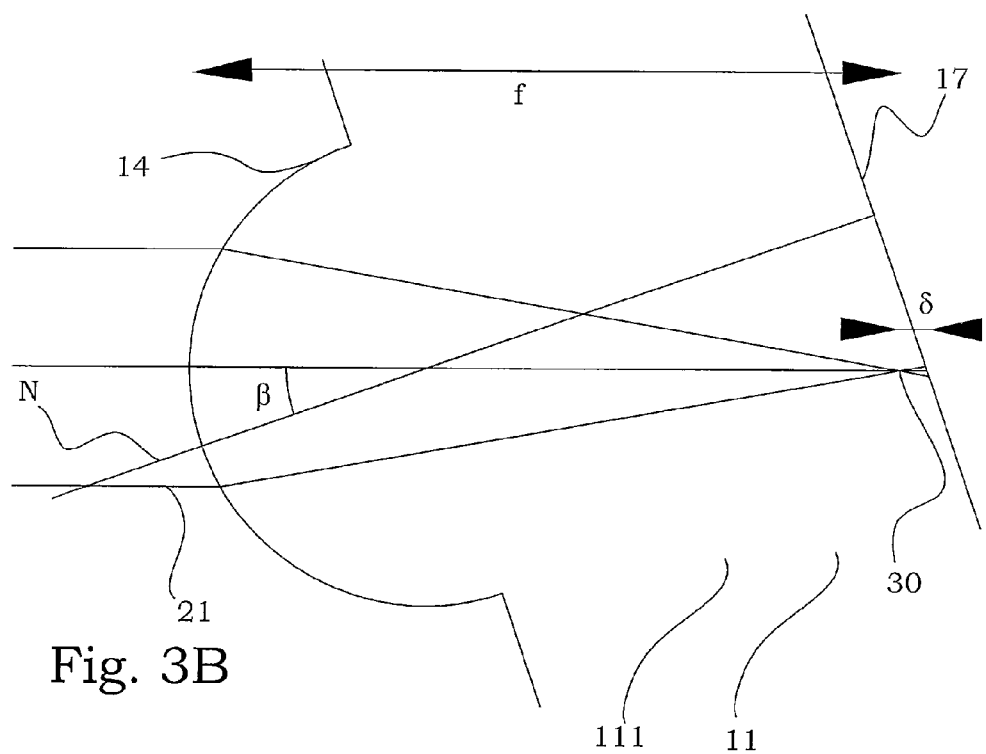

FIG. 3B illustrates a situation, where the beam of parallel rays 21 reaches the polymer foil at a non-zero angle of incidence 13. The rays 21 will refract into a focal point 30. However, due to the non-zero angle of incidence β, the focal point will not be situated at the flat interface 17, but at a small distance 8 above the interface 17. This means that any image data bearer structures 116 provided at the interface 17 become somewhat unsharp, as view through the microlenses 14.

Figure 3C:
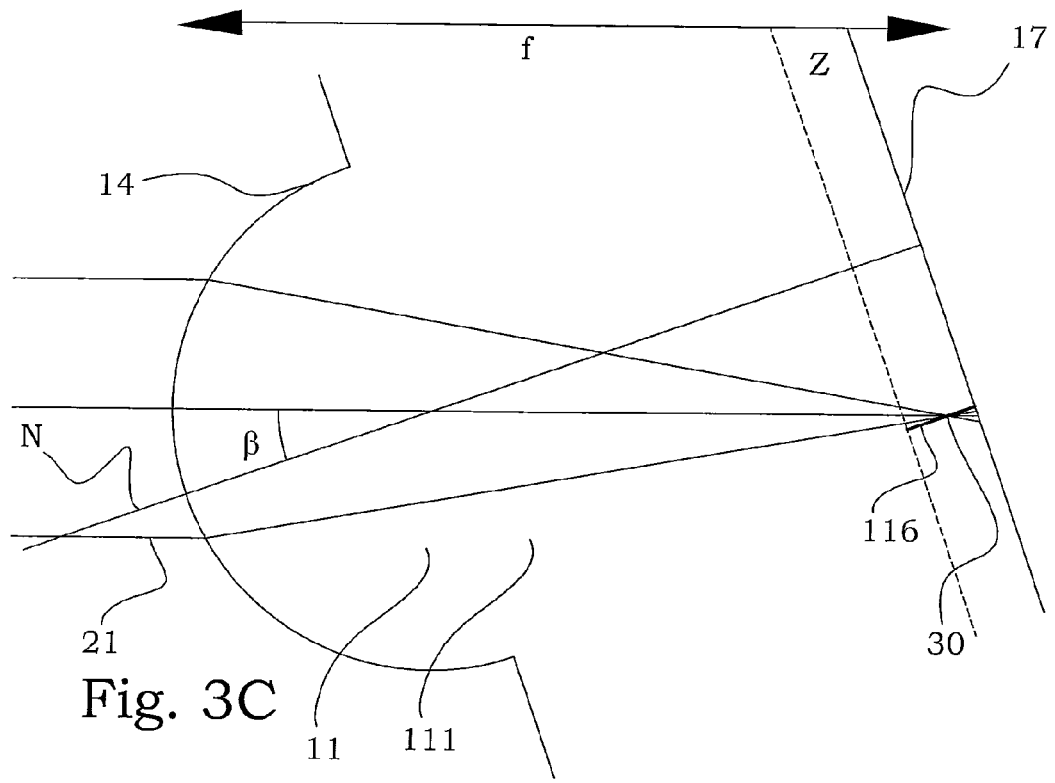

In US2005/0180020, this behaviour is addressed and FIG. 3C illustrates a similar situation with the proposed solution. The solution is based on that the image data bearer structures 116 are given a considerable extension in the thickness direction, i.e. the image data bearer structures 116 are not provided at an interface, but instead within a zone Z. Rays 21 having a non-zero angle of incidence may now have their focal point 30 coinciding with a point at the image data bearer structures 116. In this particular direction, the imaging of the image data bearer structure 116 will be sharp.

Figure 3D:
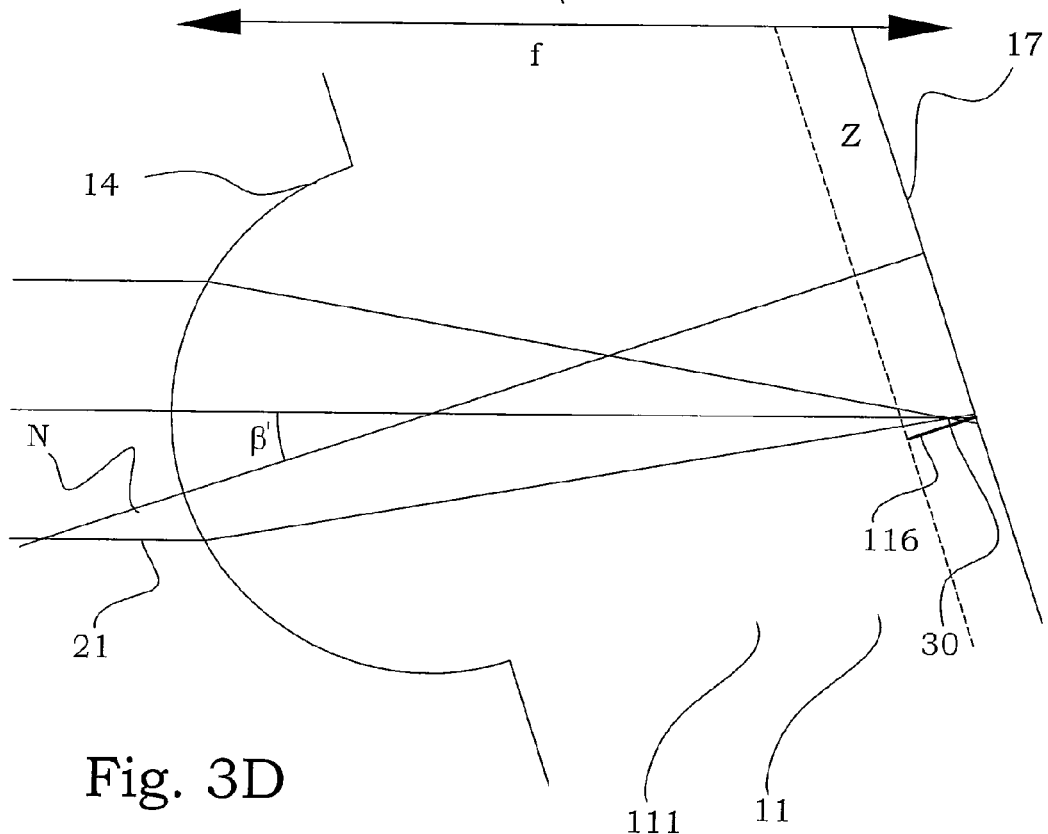

However, as illustrated in FIG. 3D, rays leaving the microlens 14 at a somewhat differing angle of incidence β', will also carry information from the image data bearer structure 116. The total integral image from a whole array of microlenses 14 will therefore still be blurred. The solution proposed in US2005/0180020 may in some special cases improve the imaging sharpness, but will not generally solve the problem of unsharp imaging at higher angles of incidence.

Figure 4:
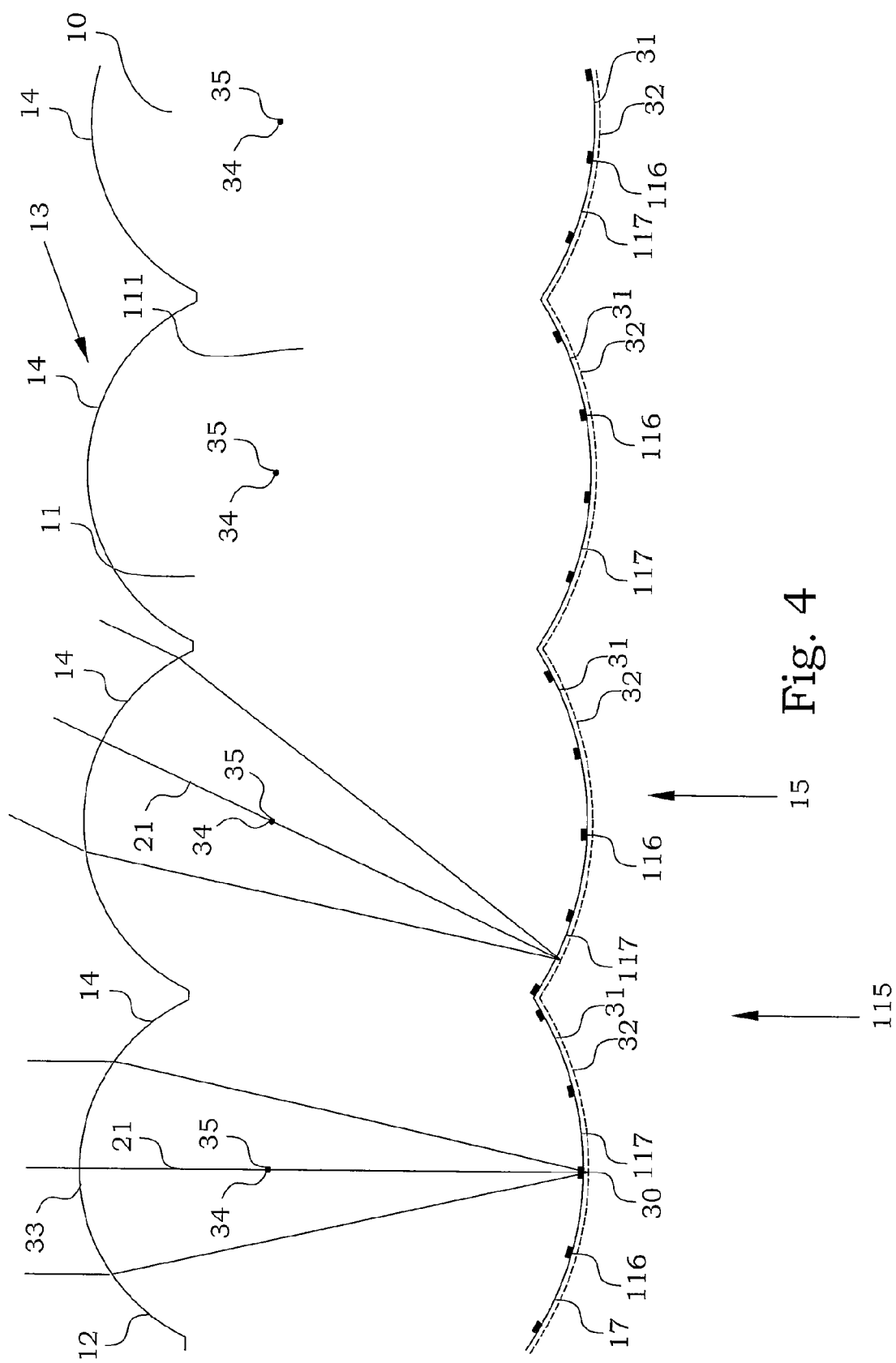
FIG. 4 is a schematic illustration of focal planes of a polymer foil stack according to the present invention.

Instead, according to the present invention, the plane shape of the interface 17 is abandoned. As seen in FIG. 4, instead of having the image data bearer structures 116 provided in a flat relationship, the image data bearer structures 116 are instead superimposed onto an interface having a general shape defined by an array 115 of curved interface portions 117. The array 115 of curved interface portions 117 is in registry with the array 13 of microlenses 14. Furthermore, the distance between the interface 12 of the microlenses 14 and the interface 17 of the curved interface portions 117 is close to a focal length of the microlenses 14. Since both interfaces are curved, such distance is in the present disclosure defined as the maximum distance, in the direction of the main surface normal N, between any portions of the interfaces. Preferably, each of the curved interface portions 117 correspond to a total image optimum appearance plane 31 of a respective microlens 14. The total image optimum appearance plane 31 is a plane at which image data bearer structures 116 are depicted through the microlenses 14 in an optimum manner, defined according to a predetermined criterion. Different such constructions are discussed further below.

The curved interface portions 117 are provided directly in the polymer foil 11, thereby gaining a lateral robustness in analogy with the microlenses. This is typically performed by imprinting or embossing the structures in the polymer foil 11. The image bearer structures 116 are superimposed, also by imprinted or embossed structures or alternatively as printed structures.

The lateral positioning of the curved interface portions 117 with respect to the respective microlenses 14 should be as exact as possible, i.e. in the case of spherical microlenses and spherical interface portions, the centre of curvature should preferable coincide. However, also a small offset in a lateral direction will in a general case improve the sharpness compared to a flat object interface plane. The offset should, however, not exceed 20% of the base diameter of a curved interface portion, where the new errors typically create unsharpnesses in the same order of magnitude as flat interfaces. Preferably, the offset should not exceed 10% and most preferably not exceed 5% of the base diameter of a curved interface portion. This therefore calls for a very well controlled manufacturing. However, once the foils is created, the relative positions are maintained by the continuous polymer foil, both in lateral direction and in directions perpendicular to the polymer foil surface.

The agreement between interface distance and focal length is valid in a first approximation. In such an embodiment, the total image optimum appearance plane 31 coincides with a focal plane 32 created by focal points 30 of rays 21 passing the surface 33 of the respective microlens 14 at a perpendicular angle. This will give an optimum image of the focal point as viewed through the microlens. In the case of a spherical microlens, such curved interface portions 117 will be spherical surface sections. In other words, if the microlenses 14 are essentially spherical microlenses, the curved interface portions 117 are essentially spherical interface portions, and a centre of curvature 34 of each of the microlenses 14 essentially coincides with a respective centre of curvature 35 of the curved interface portions 117. In a mathematical way this can be expressed as:

$$f = t = R + r, \quad (4)$$

where r is the radius of the curved interface portions.

However, as will be illustrated here below, an appearance of a composed total image that according to other criteria is better can be obtained by a slightly different distance. However, the distance will typically always be rather close to the focal length. The total image optimum appearance plane 31 is typically conformal to a focal plane 32 of rays 21 passing the surface 33 of a respective microlens 14 at a perpendicular angle.

Figure 5A:
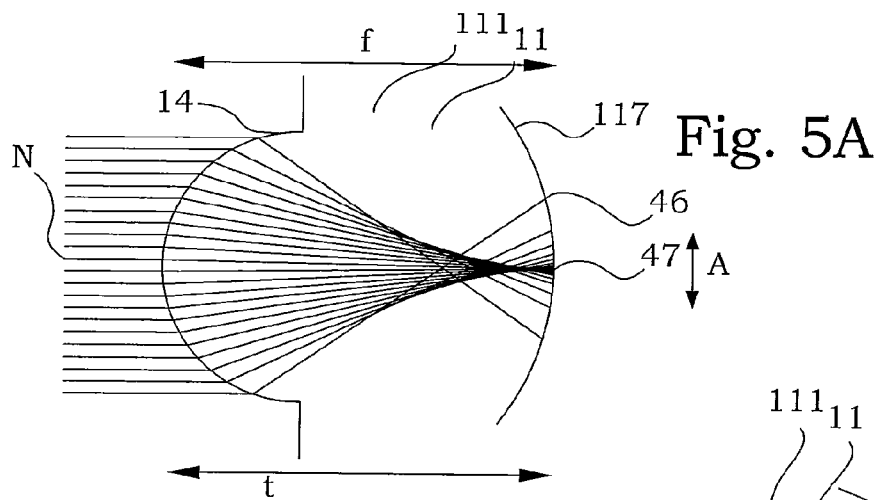
FIGS. 5A-5D are schematic illustrations of relations between focal spots and distances in a polymer foil according to the present invention.

If the microlenses would be totally free from aberrations and a point structure is to be imaged, the ideal distance between the microlenses and the image structures would be equal to the focal plane of the microlenses. However, in reality, due to aberrations, light ray passing the outer part of a microlens will experience another effective focal distance than paraxial rays passing through the middle. Microlenses used for the present purpose can typically be fairly well approximated as parts of a sphere, which introduces spherical aberrations. This becomes particularly obvious when considering shallow angles of view relative the polymer foil surface, i.e. high angles of incidence relative the surface normal. Consider FIG. 5A. One microlens 14 and a corresponding curved interface portion 117 of an interface plane are illustrated. The thickness t of the polymer foil 11 agrees with the focal length for paraxial rays and rays leaving the microlens at the axis obviously emanates from a spot 47 at the curved interface portion 117 intended to be viewed. However, rays passing the edge parts of the microlens 14 will refract more, thus having a shorter focal length. Rays escaping the microlens at the edges of the microlens thus emanate from positions 46 besides the spot 47 intended to be viewed. The total image, corresponding to an area A from which the majority of the rays come from, will therefore become blurred.

Figure 5B:
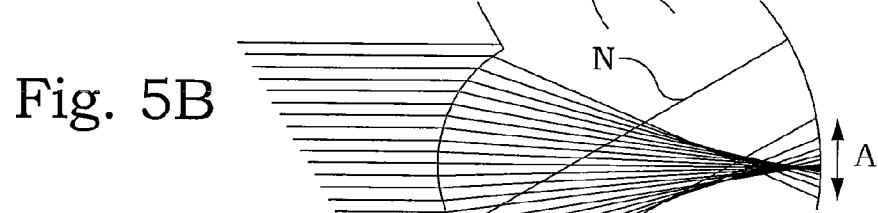

As seen in FIG. 5B, the area that is viewed through the microlens 14 is the same when the polymer foil is viewed in a shallower angle, i.e. no change in the image quality is experienced due to the unchanged viewed area. This is considerably different from the situation in FIGS. 3A and 3B.

Figure 5C:
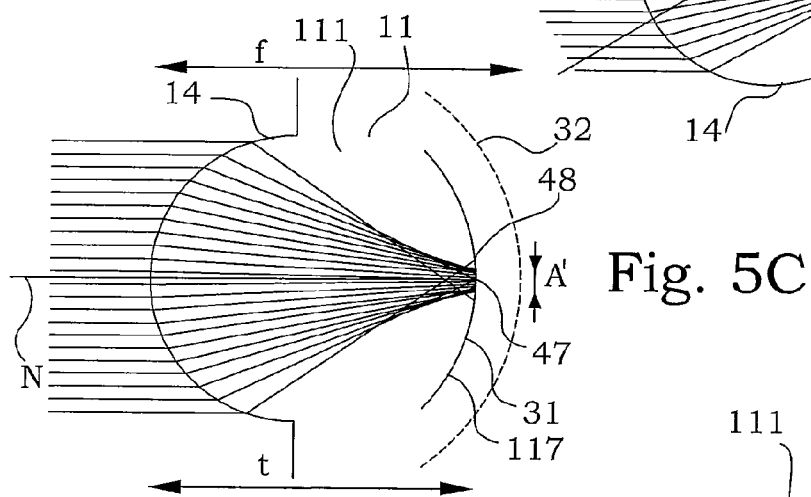
Figure 5D:
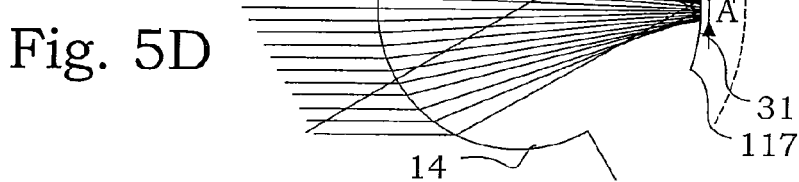

As a consequence, it has been found that the distance between the curved interface portions 47 and the microlenses 14 preferably is somewhat shorter than at least a paraxial focal length of the microlenses 14. FIG. 5C illustrates such a situation. Here the ideal paraxial focal length, i.e. the focal plane 32 is situated a very small distance behind the curved interface portion 117. However, since the angles of the rays close to the optical axis of the microlens are small, the error in the imagined spot becomes small anyway. At the contrary, rays refracted at the edge of the microlens instead reaches a spot 48 that is much closer to the spot 47 intended to be viewed, compared to the distance between points 46 and 47 in FIG. 5A. In that way, the total imagining becomes sharper, since the area A' from which rays can be originating and still be provided as a parallel beam of rays is smaller than before. The curved interface portion 117 therefore in this situation forms a total image optimum appearance plane 31 of the microlens. The situation is the same also at higher angles, as illustrated in FIG. 5D.

In a typical case, the total image optimum appearance plane 31 is conformal to a focal plane of rays passing the surface of the respective microlens at a perpendicular angle. In a preferred embodiment, the total image optimum appearance plane is a plane on which parallel beams impinging over the entire surface of the respective microlens refracts within a predetermined area A'.

If an as small imagined spot area as possible is requested, the optimum choice of distance between the geometrical structure and the microlenses for a polymer foil having a positive magnification is close to the focal length of the microlenses, but typically somewhat less. The exact choice of distance depends on the requested sharpness, the properties of the microlenses and the actual shape of the geometrical structures. A further factor influencing the sharpness of the imaging is the actual height magnitude of the geometrical structures. If the geometrical structures to be imaged have a significant height, the mean distance to the microlenses has to be selected in order to optimise the sharpness of the different parts of the geometrical structures in a requested manner.

For a polymer foil having a negative magnification, a distance between the geometrical structure and the microlenses may instead be selected to be somewhat larger than the focal length of the microlenses.

When the eye composes the integral image from an optical device according to the present invention, a number of part images are combined. As mentioned above, the part images collect their optical information from a respective small area A' on the curved interface portions 117. The size of the area A' depends e.g. on the focussing properties. Since the imagined spot is shifted a distance $P_f - P_o$ between two neighbouring microlenses, it is preferred if the imagined spot size is at least in the same order of magnitude, and more preferably equal to the difference $P_i-P_o$. If the spot size is less than this difference, certain areas of the geometrical structures will not contribute at all to the integral image, since no microlens will be able to refract rays between the spot areas to the viewer. At the same time, too large spot sizes will result in that optical property information will be mixed between part images produced by neighbouring microlenses, contributing to a blurring of the integral image. Therefore, the predetermined area A' is preferably equal to an area of a respective microlens divided by a square of the magnification of the respective microlens. This means that each intended depth for the composed image has an optimal foil thickness.

The above described arrays of microlenses and curved interface portions are intended to be two-dimensional arrays. A similar effect in one dimension may be obtained also by one-dimensional arrays. However, the extension in a direction transverse to this one-dimensional array will typically depend on the extension of the microlenses themselves, which restricts the possibilities to obtain attractive imaging effects. It is therefore believed that two-dimensional arrays are to prefer in most applications.

The image data bearer structure 116 can be constituted in different manners, e.g. as geometrical structures giving rise to different optical properties or simply different colours. If identical image data bearer structures 116 are provided at the same position at all curved interface portions, an impression of an infinite image depth and magnification is obtained, if the optical device is viewed from an infinite distance. The use of such images is believed to be somewhat limited. In one embodiment therefore, the image data bearer structures 116 that are superimposed on one of the curved interface portions 117 is different from image data bearer structures 116 that are superimposed on a neighbouring curved interface portion 117 with respect to shape, colour or position relative the respective curved interface portion 117. In other words, the data bearer structures 116 changes from one curved interface portion 117 to the next.

Figure 6:
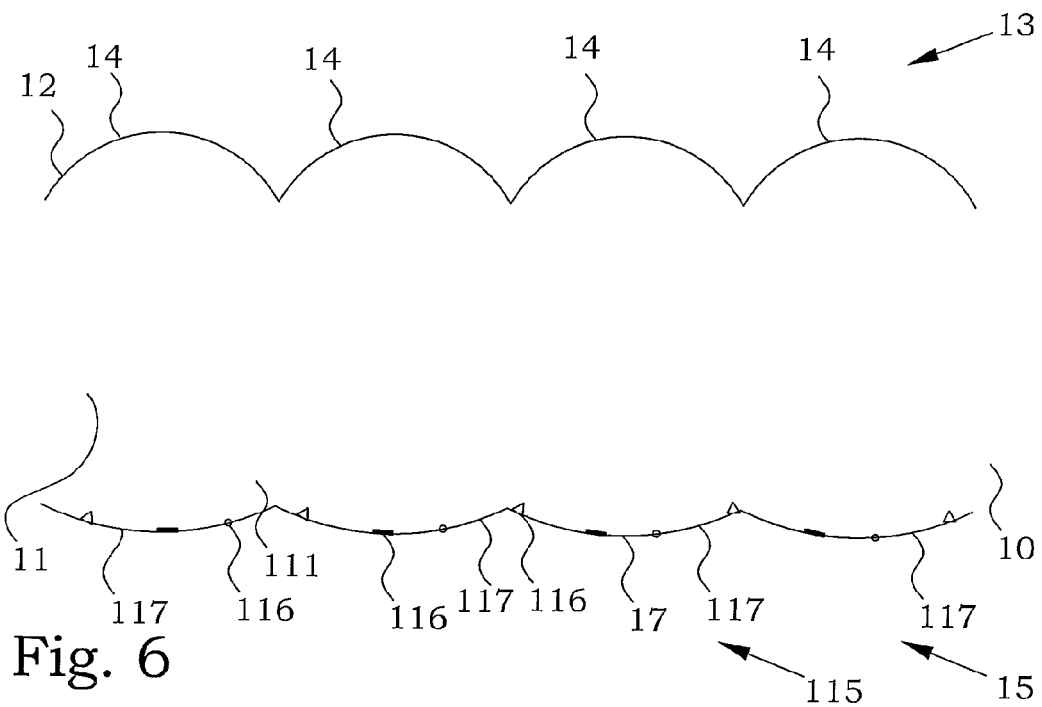
FIG. 6 is a schematic illustration of periodic image data bearer structures in a polymer foil stack according to the present invention.

In an approach analogue to what is used in FIG. 1, where almost identical image data bearer structures 116 are superimposed onto the curved interface portion 117, but with a small offset, as illustrated in FIG. 6. The periodicity of an array of image data bearer structures 116 thereby differs slightly as compared to the periodicity of the array 115 of curved interface portions 117. The image data bearer structures are thus provided as an array of a same symmetry as the array of curved interface portions 117 or the array of the microlenses 14. A symmetry axis of the array of image data bearer structures 116 are essentially parallel to a symmetry axis of the array of curved interface portions 117 or the array of the microlenses 14. Finally, a periodicity of the array of image data bearer structures 116 differs from a periodicity of the array of curved interface portions 117 or the array of the microlenses 14 by a non-integer factor. In other words, the array 115 of the curved interface portions 117 is in registry with the array 13 of microlenses, while the array 15 of image data bearer structures 116 is not.

This approach can be generalised somewhat by only requiring that a first portion of the image data bearer structures at a first one of the curved interface portions is the same as a second portion of the image data bearer structures at a neighbouring curved interface portion with respect to shape and colour, but where a position of the first portion relative to the first curved interface portion is different from a position of the second portion relative to the neighbouring curved interface portion.

In an even more general approach also colour and shape of the image data bearer structures may differ between neighbouring curved interface portions. This opens up for creation of more complex and sophisticated images, where each image data bearer structure at each curved interface portion is specially designed to give rise to a synthetic total image, which is not provided as a whole at the curved interface portion. This can be seen as an analogy to integral photography.

One particular embodiment of image data bearer structures is to provide a reflecting surface at the entire or at least a large part of the curved interface portions, interrupted by "ordinary" image data bearer structures. If the microlenses and curved interface portions have a common centre of curvature, rays falling into the microlenses will be reflected by the reflecting surface at a right angle and return essentially in the same direction as from where it came. These reflecting surfaces will then appear as very bright areas when exposed for light, since they are operating as retroreflecting surfaces. Such effects can be utilised in order to create further attractive imaging properties, e.g. for improving a contrast between empty surface areas of the curved interface portions and areas having image data bearer structures.

The polymer foil stack may comprise only one polymer foil. However, in other embodiments the polymer foil stack may be composed of more than one polymer foil, together presenting the requested properties.

Figure 7A:
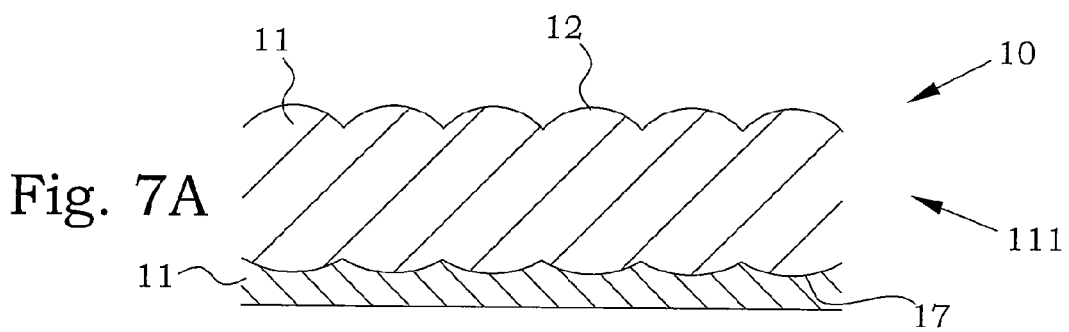
FIGS. 7A-7C are schematic illustrations of foils stacks.

In the embodiments described above, the interface at which the microlenses appear as well as the interface at which the curved interface portions appear are illustrated as surfaces of the polymer foil. However, the curved interface portions may also be provided at an inner interface of the polymer foil. Such a situation is illustrated in FIG. 7A. Here a foil stack comprising two layers is illustrated. The upper layer has microlenses at its surface, and in the interface between the upper and lower layer, the image data bearer structures are provided at curved interface portions. By utilizing optical properties of such a lower layer, additional imaging effects can be achieved. Such an additional layer may also provide a protection against wear of the image data bearer structures.

Figure 7B:
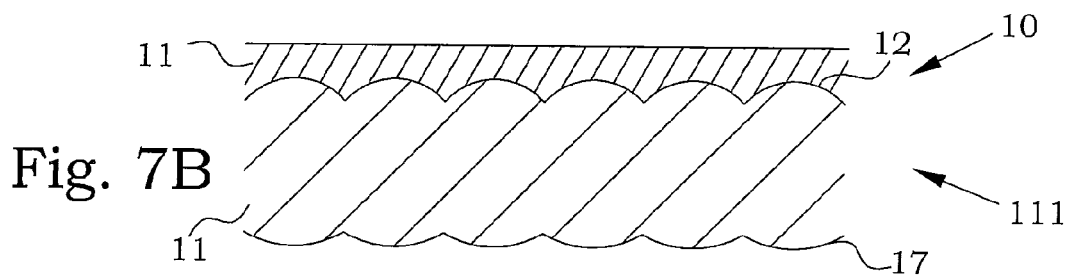

Likewise, as illustrated in FIG. 7B, the interface of the microlenses can be an inner interface between two layers of polymer foils. In such a way, the surface of the microlenses can be protected by a protection layer. Such a protection layer may also be provided to adapt the properties of the produced images, since the image depth and focal distance depends on the refractive index of any material covering the microlenses.

Figure 7C:
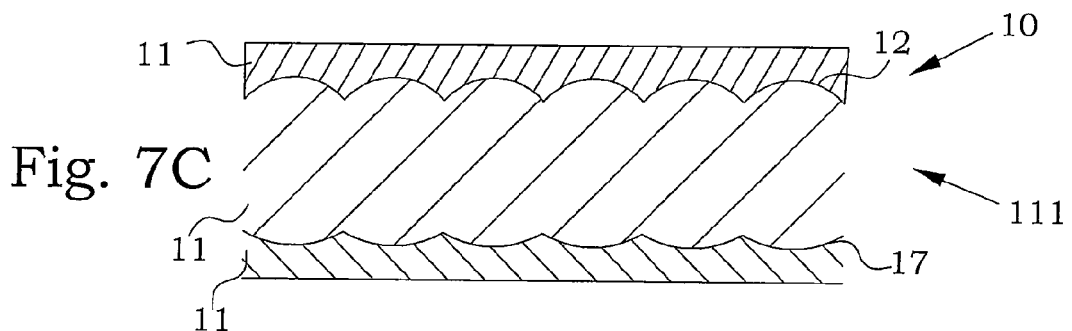

As anyone skilled in the art understands, both interfaces may be inner interfaces, as illustrated in FIG. 7C.

Non-exclusive examples of polymer materials that can be utilized for these purposes are polycarbonate, cellulose acetate, polypropylene and polyethylene terephthalate.

The polymer foil has to be at least almost as thick as the focal length of the microlenses. Furthermore, it is preferred if the polymer foil is not too thick. If the optical device according to the present invention e.g. is used as a security label, the thickness of the polymer foil will add to the thickness of the item to be secured.

For e.g. postcards, a foil of 0.3 mm may be acceptable. However, for thinner items to be secured, e.g. packages and/or paper documents, polymer foil thicknesses of less than 0.1 mm would to be preferred. However, there are also problems with polymer foils that are too thin. The foil becomes more fragile and more difficult to handle, e.g. during manufacturing processes. A practical lower limit of the polymer foil is today believed to be around 10 micrometers.

When providing an optical device according to the principles presented above, the typical manner is to provide the polymer foil stack as one body, i.e. with any part foils firmly attached to each other, or as one foil. This is particularly important due to the high requirement of alignment between the curved interface portions and the microlenses.

Figure 8A:
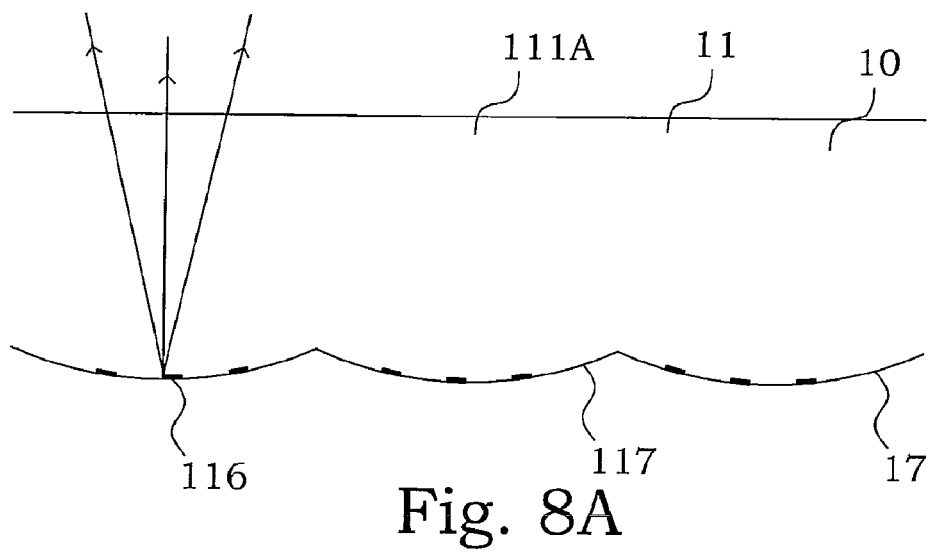
FIGS. 8A-8D are illustrations of use of a split polymer foil stack.
Figure 8B:
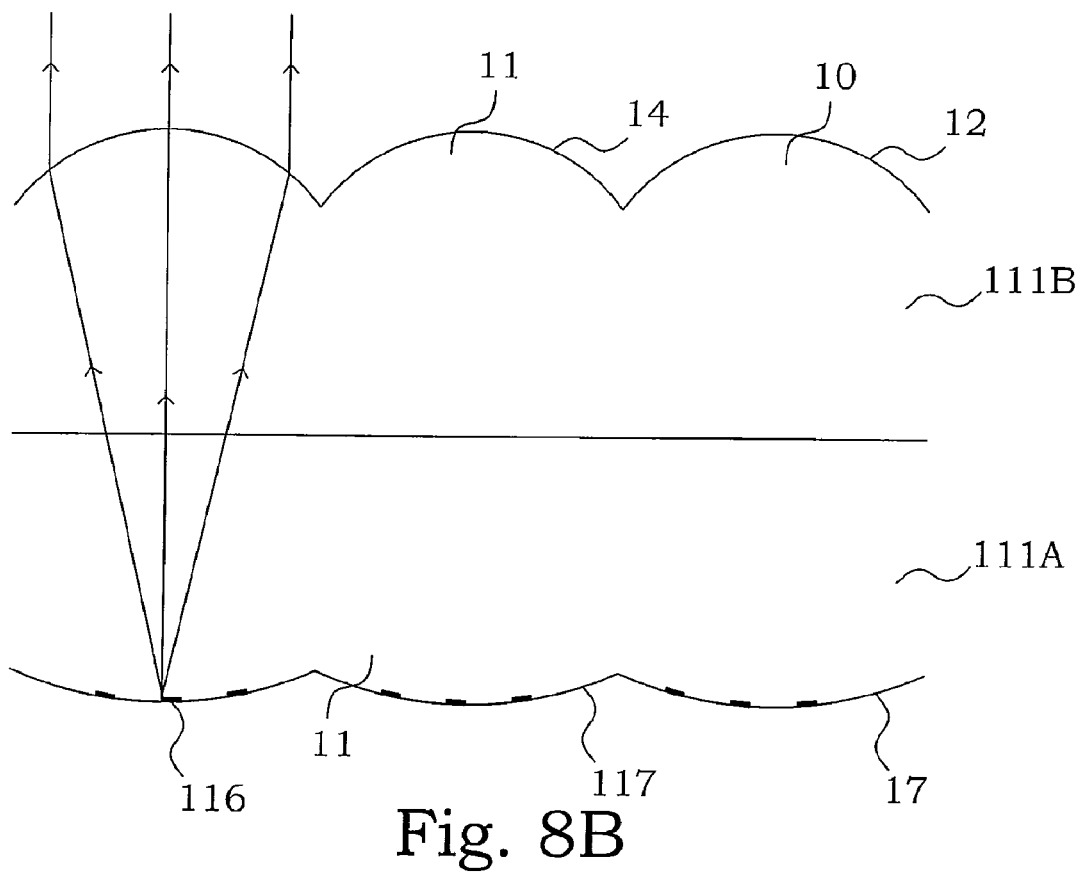

However, in certain applications, in particular when the optical device is used for authentication control purposes, the use of non-bonded polymer films can be required. As illustrated in FIG. 8A, a polymer foil stack portion 111A can be provided at an object to be verified. The polymer foil stack portion 111A comprises an interface 17 with the curved interface portions 117 and the superimposed image data bearer structures 116. However, without any interface with suitable microlenses, no composed image can be created, and the individual image data bearer structures 116 are typically too small to be seen. In FIG. 8B, another polymer foil stack portion 111B, a microlens 14 foil, is placed on top of the original stack portion 111A and when coming into registry, an image can be seen through the microlens 14 array. The original polymer foil stack portion thereby operates as a "coded" image, which can be "decoded" by the provision of a matching "key", i.e. the microlens foil. In other words, the original polymer foil acts as a couvert security feature. One and the same microlens foils can furthermore be used for detection of many different images, since the only request is that the arrays are possible to position in registry with each other. In conclusion, the polymer foil stack here comprises a first stack portion and second stack portion being separable from each other. The first stack portion 111A comprises the array of curved interface portions 117 and the second stack portion 111B comprises the array of microlenses 14.

For providing a coding marking, it is only necessary that the first stack portion is present, which is why the optical device 10 in a most general embodiment only needs to comprise the first stack portion 111A.

Figure 8C:
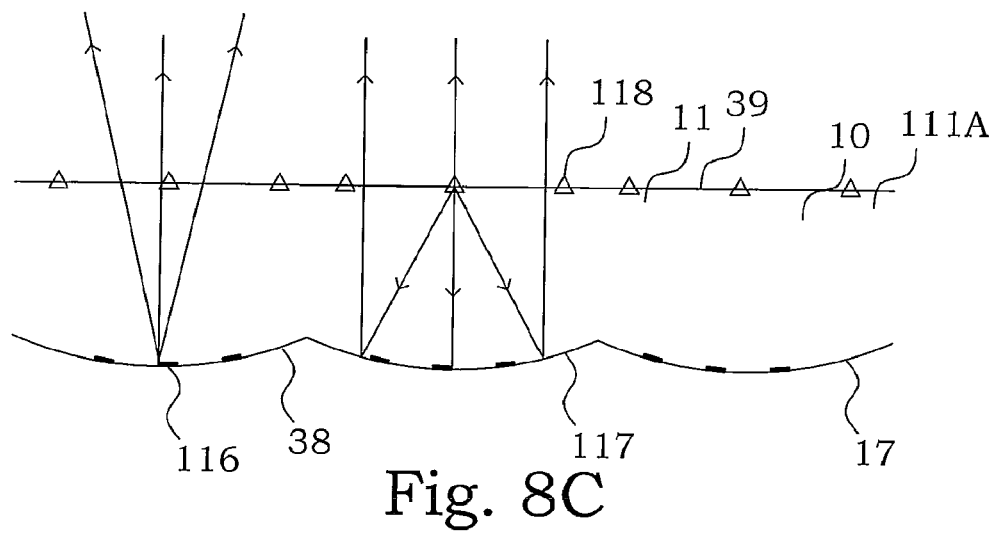

This effect can be further developed. In FIG. 8C, a polymer foil stack 111A with curved interface portions 117 and the superimposed image data bearer structures 116 is provided. The curved interface portions 117 are furthermore covered with a reflecting layer 38. An additional array 118 of image data bearer structures is provided at an interface 39, in this embodiment the upper surface of the polymer foil stack, at a distance to the curved interface portions that corresponds to a focal length of the reflecting layers. The reflecting layer of the curved interface portions will namely act as focussing mirrors, and rays originating at the additional array 118 of image data bearer structures will be magnified and provided as a beam of parallel rays. In such a way, a viewer can compose a total image from rays coming from the different curved interface portions 117, corresponding to the additional array of image data bearer structures. However, the original image data bearer structures provided directly at the curved interface portions are still almost impossible to detect by the human eye. In summary, in this embodiment, the interface of the curved interface portions is provided with an optically reflecting layer 38 and the polymer foil stack 111A comprises an additional interface also comprising image data bearer structures. The additional interface is situated close to a focal plane of the optically reflecting layer 38.

Figure 8D:
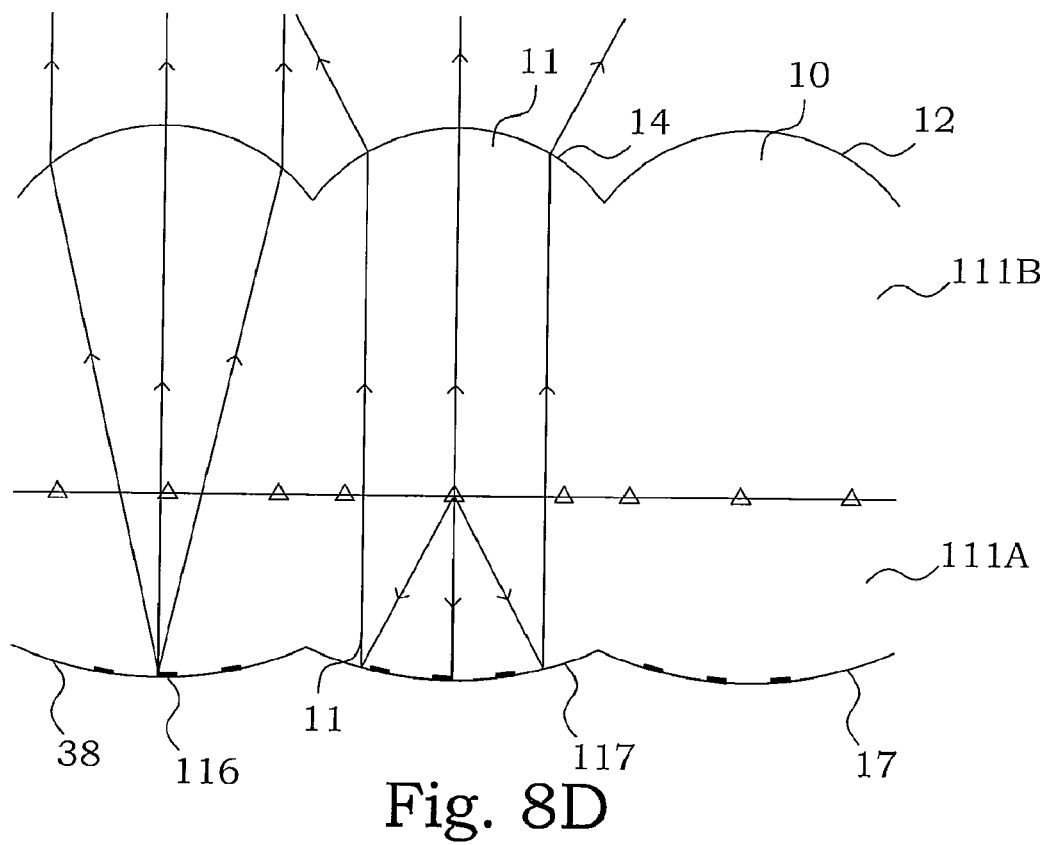

When, as illustrated in FIG. 8D, covering the first polymer foil stack 111A with a polymer foil stack 111B presenting a matching array of microlenses 14, the optical situation will drastically change. The parallel rays of the additional array of image data bearer structures will be refracted in a diverging manner, which means that no viewer can detect any image composed by this additional array 118 of image data bearer structures. However, now instead, the image data bearer structures provided at the curved interface portions 117 provide a beam of parallel rays, which can be detected by a viewer and composed into a total image. In other words, when the array of microlenses 14 is put on top of the original foil, the first image disappears and a second image appears instead. In other words, the interface of the curved interface portions 117 is provided with an optically reflecting layer 38 and the first stack portion 111A comprises a third interface comprising image data bearer structures. The third interface is situated close to a focal plane of the optically reflecting layer.

Figure 9A:
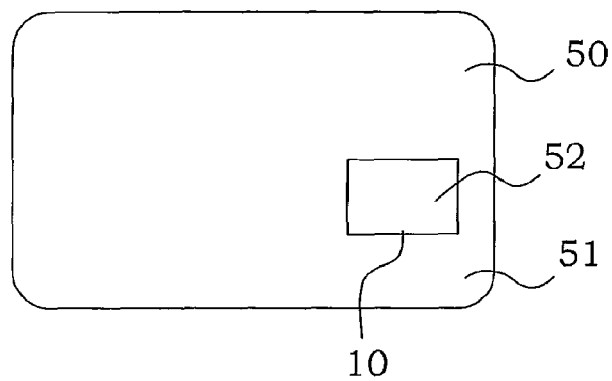
FIG. 9A is a schematic illustration of an embodiment of a valuable object according to the present invention.

An optical device according to the present invention has many applications. By providing the geometrical structures inside the polymer foil, e.g. by covering the backside of an imprinted foil with an additional irremovable layer, as to form a monolithic foil, the possibilities to copy the optical device are practically entirely removed. This makes the optical device very interesting as a security label, as also discussed further above. In FIG. 9A, a valuable object 50, in this case a credit card 51, comprises a security label 52 comprising at least one optical device 10 according to the above description. In a typical case, the optical device 10 is adhered in some way to the valuable object 50. A characteristic image can easily be provided by the optical device 10 in order to certify that the valuable object 50 is a genuine one. The valuable object may not necessarily be an object directly connected to economical transactions. The valuable object may also e.g. be clothes, watches, electronics products etc. where counterfeiting is common.

Figure 9B:
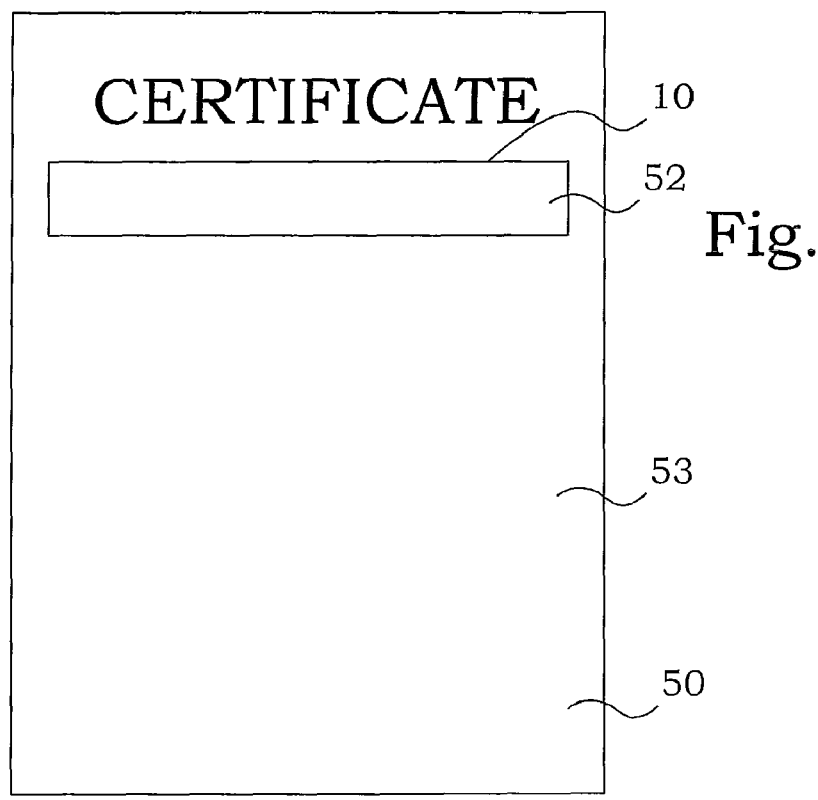
FIG. 9B is a schematic illustration of an embodiment of a valuable document according to the present invention.

Since the optical devices according to the present invention are believed to be of reasonable cost, a security label 52 comprising at least one optical device 10 according to the above description can even be of interest to certify the genuinety of documents 53, as illustrated in FIG. 9B. The document 53 may be valuable as such, e.g. a bank note or a guarantee commitment. However, the document 53 may not necessarily have any own value, but the security label 52 can be provided in order to guarantee that the information in the document is authentic.

Figure 9C:
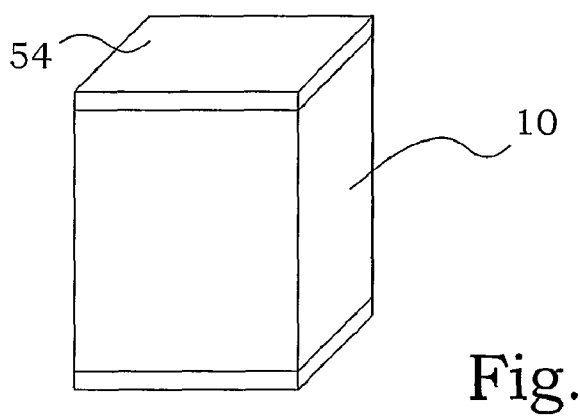
FIG. 9C is a schematic illustration of an embodiment of a package according to the present invention.

Since the mass production costs of the optical device are expected to be small, the size of the security label does not necessarily have to be small. It is even feasible that the security may occupy a large part of a surface of an object in order to verify the authenticity. FIG. 9C illustrates a package 54 to a large extent consisting of a large area optical device 10 according to the present invention. If a non-transparent appearance is preferred, the optical device 10 is preferably adhered, e.g. by gluing, to some backing material, typically based on some paper product. Since the optical appearance of the optical device 10 may be designed to be attractive for a view to look at, the optical device 10 can have the combined functionality of ensuring authenticity as well as providing an eye-catching package material. It would e.g. be possible to authenticate e.g. a perfume by providing a package or even the perfume bottle itself by the optical device 10.

The applications of optical devices according to the present invention are enormous. Most applications are based on sheet materials, where the optical device can be provided as a part or the entire sheet material. The fields of application are very different, ranging from e.g. currencies, documents, financial instruments, product and brand protection, product marking and labelling, packaging, tickets, book covers, electronic equipment, clothes, footwear, bags, wallpapers to toys. The optical devices can be applied in any context where the appearance of a virtual three-dimensional image may be of benefit.

One way to manufacture an optical device according to the present invention is by utilising double-sided nano imprinting in polymer foils. A short summary of a possible manufacturing procedure will be given here below.

Figure 10:
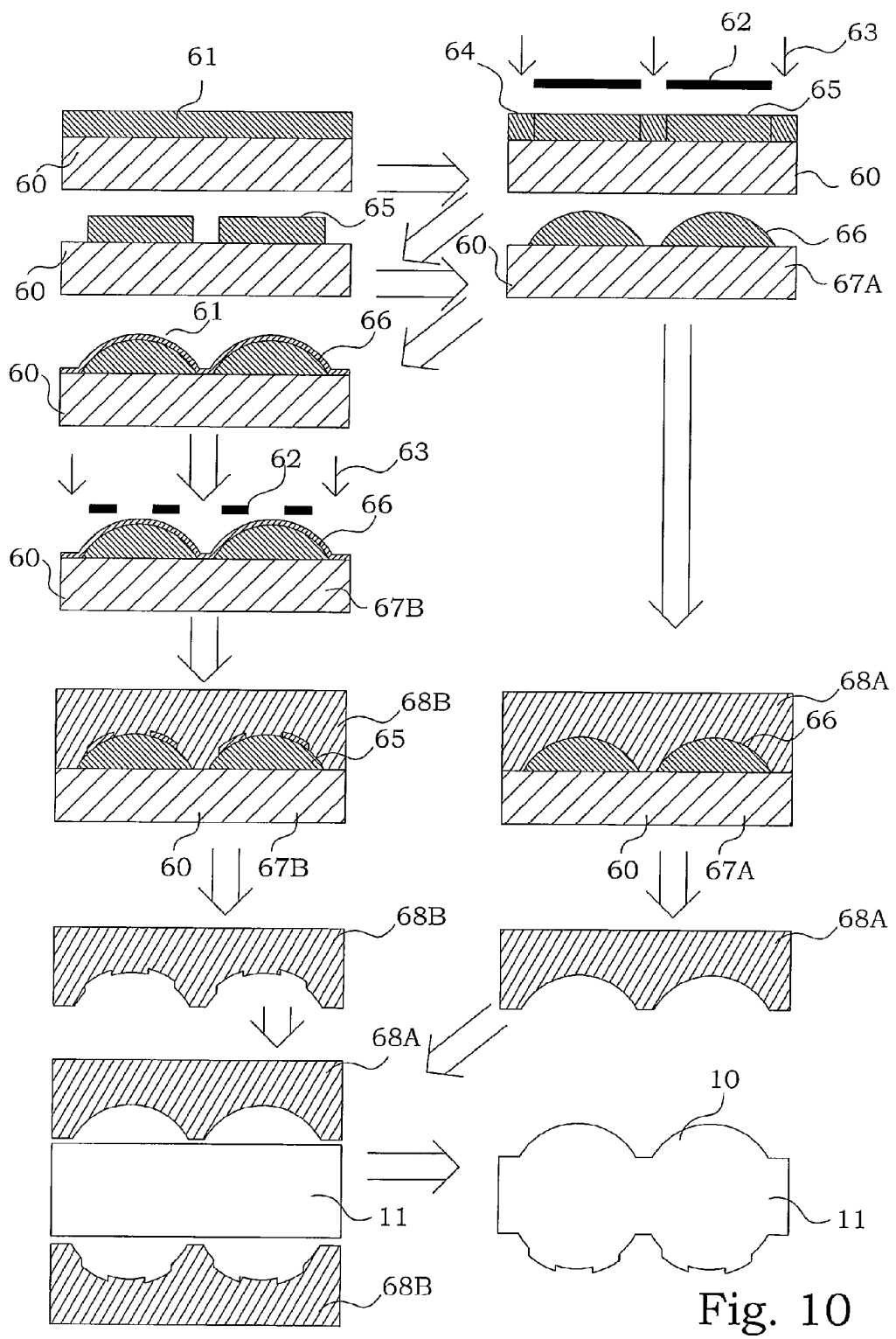
FIG. 10 is a schematic illustration of a manufacturing process for optical devices according to the present invention.

FIG. 10 illustrates a possible manufacturing procedure for optical devices according to the present invention. The described method is based on mastering and replication through nano imprinting. However, anyone skilled in the art realises that manufacturing also may be performed utilizing other techniques or variants of the below described technique.

A substrate 60 is covered by a photoresist 61 by ordinary spinning methods. A photo mask 62 is placed above the photoresist and the device is irradiated by ultraviolet light 63. Areas 64 exposed to the irradiation undergoes a chemical alteration which makes the photoresist in these areas possible to remove by solving procedures. Only areas 65 covered by the mask 62 remain. If microlenses as well as spherical curved interface portions are to be formed, the typical manner to proceed is to heat the substrate 60 until the photoresist 61 melts. Due to surface tension, essentially spherical volumes 66 are formed. A master 67A of the microlens structures is thus achieved. When the image structures are to be superimposed, the structures are typically formed directly by another masking procedure on top of the master of the general curved interface portions, forming a master 67B of the image structures together with the curved interface portions.

In either case, the masters 67A, 67B are used for fabrication of a respective replication tool. In a presently preferred procedure, a seed layer is sputtered on top of the masters 67A, 67B, followed by an electroplating with Ni, forming a respective rigid replication tool 68A, 68B with a complementary shape to the respective master 67A, 67B. The master 67A, 67B is then etched away, leaving the replication tool 68A, 68B. The tool surface may be treated for e.g. anti-sticking purposes.

When replication tools 68A, 68B of both the microlens array and the array of geometrical structures are available, they are placed on opposite sides of a polymer foil 11. By applying appropriate pressure and temperature over the assembly, the polymer foil 11 will be nano-imprinted by the requested structures. When the replication tools are removed, an optical device 10 according to the present invention is available.

As already mentioned further above, the optically distinguishable image data bearer structures are provided by imprinting or embossing together with the provision of the curved interface portions. As an alternative, it is also possible to provide the optically distinguishable image data bearer structures by use of UV embossing techniques, which also can be used in a continuous casting manner. The optically distinguishable image data bearer structures can, in a further alternative, be provided by printing techniques on the embossed curved interface portions. Such manufacturing then requires an extra step of manufacturing, during which alignment accuracy is very crucial.

In the embodiments above, all arrays have been illustrated as regular, periodic array. In principle, the basic idea of the present invention also operates for non-periodic arrays. However, the complexity and demands for precision will in such cases be even higher. Most commercial optical devices are therefore believed to be based on periodic arrays.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] WO 94/27254
[2] US 2005/0180020
[3] M. C. Hutley et. al., "The Moiré magnifier", Pure Appl. Opt. 3, 1994, pp. 133-142.
[4] H. Kamal et al., "Properties of moiré magnifiers", Optical Engineering 37 (11), November 1998, pp. 3007-3014.

The invention claimed is:

1. Optical device for providing a synthetic integral image, comprising a polymer foil stack;
   said polymer foil stack comprising at least one polymer foil;
   a first interface of said polymer foil stack comprising optically distinguishable image data bearer structures;
   said image data bearer structures being embossed or printed structures;
   said first interface having a general shape defined by a first array composed of curved interface portions, on which said image data bearer structures are superimposed;
   a second interface of said polymer foil stack having a second array composed of microlenses;
   said second interface being provided at a distance from said first interface, said distance being close to a focal length of said microlenses;
   said second array being in registry with said first array;
   each of said curved interface portions corresponding to a total image optimum appearance plane of a respective microlens;
   said second array having a periodicity of less than 200 micrometers;
   an offset in lateral position of the curved interface portions with respect to said respective microlenses is smaller than 20% of a base diameter of a curved interface portion.

2. The optical device according to claim 1, wherein said second array is a periodic two-dimensional array.

3. The optical device according to claim 1, wherein said total image optimum appearance plane is conformal to a focal plane of rays passing the surface of said respective microlens at a perpendicular angle.

4. The optical device according to claim 3, wherein said total image optimum appearance plane coincides with said focal plane of rays passing the surface of said respective microlens at a perpendicular angle.

5. The optical device according to claim 1, wherein said total image optimum appearance plane is a plane on which parallel beams impinging over the entire surface of said respective microlens refracts within a predetermined area.

6. The optical device according to claim 5, wherein said predetermined area is equal to the area of said respective microlens divided by the square of a magnification of said respective microlens.

7. The optical device according to claim 1, wherein said microlenses are essentially spherical microlenses, said curved interface portions are essentially spherical interface portions, and a centre of curvature of each of said microlenses essentially coinciding with a respective centre of curvature of each of said curved interface portions.

8. The optical device according to claim 1, wherein said first interface is a first surface of said polymer foil stack.

9. The optical device according to claim 1, wherein said second interface is a second surface of said polymer foil stack.

10. The optical device according to claim 1, wherein said image data bearer structures superimposed on one of said curved interface portions are different from image data bearer structures superimposed on a neighbouring curved interface portion with respect to at least one of shape, colour and position.

11. The optical device according to claim 10, wherein a first portion of said image data bearer structures at a first curved interface portion is the same as a second portion of said image data bearer structures at a neighbouring curved interface portion with respect to shape and colour; a position of said first portion relative to said first curved interface portion being different from a position of said second portion relative to said neighbouring curved interface portion.

12. The optical device according to claim 11, wherein said image data bearer structures are provided as a third array of a same symmetry as said first array;
   a symmetry axis of said third array being essentially parallel to a symmetry axis of said first array; and
   a periodicity of said third array differing from a periodicity of said first array by a non-integer factor.

13. Optical device according to claim 1, wherein said first interface is provided with an optically reflecting layer.

14. The optical device according to claim 1, wherein said polymer foil stack comprises only one polymer foil.

15. The optical device according to claim 1, wherein said polymer foil stack comprises at least a first stack portion and a second stack portion separable from each other, whereby said first stack portion comprises said first array and said second stack portion comprises said second array.

16. The optical device according to claim 15, wherein said first interface is provided with an optically reflecting layer and said first stack portion comprises a third interface comprising optically distinguishable image data bearer structures, said third interface being situated close to a focal plane of said optically reflecting layer.

17. Optical device for providing a synthetic integral image, comprising a polymer foil stack;
   said polymer foil stack comprising at least one polymer foil;
   a first interface of said polymer foil stack comprising optically distinguishable image data bearer structures;
   said first interface having a general shape defined by a first array composed of curved interface portions, on which said image data bearer structures are superimposed;
   a second interface of said polymer foil stack having a second array composed of microlenses;
   said second interface being provided at a distance from said first interface, said distance being close to a focal length of said microlenses;
   said second array being in registry with said first array;
   said first interface being provided with an optically reflecting layer;
   said polymer foil stack further comprises a third interface comprising optically distinguishable image data bearer structures;
   said third interface being situated close to a focal plane of said optically reflecting layer.

18. The optical device according to claim 17, wherein said image data bearer structures are embossed or printed structures.

19. The optical device according to claim 17, wherein
   each of said curved interface portions corresponds to a total image optimum appearance plane of a respective microlens;
   said second array having a periodicity of less than 200 micrometers; and
   an offset in lateral position of the curved interface portions with respect to said respective microlenses is smaller than 20% of a base diameter of a curved interface portion.

* * * * *